United States Patent
Freakley

(10) Patent No.: US 6,228,906 B1
(45) Date of Patent: May 8, 2001

(54) METHOD FOR BLENDING RUBBER OR PLASTICS MATERIALS

(75) Inventor: Philip Kenneth Freakley, Hinckley (GB)

(73) Assignee: Loughborough University Innovations Limited, Loughborough (GB)

(*) Notice: Subject to any disclaimer, the term of this patent is extended or adjusted under 35 U.S.C. 154(b) by 0 days.

(21) Appl. No.: 09/011,849

(22) PCT Filed: Aug. 30, 1996

(86) PCT No.: PCT/GB96/02118

§ 371 Date: Feb. 18, 1998

§ 102(e) Date: Feb. 18, 1998

(87) PCT Pub. No.: WO97/07951

PCT Pub. Date: Mar. 6, 1997

(30) Foreign Application Priority Data

Aug. 30, 1995 (GB) ................................................ 9517655

(51) Int. Cl.[7] ...................................................... C08J 3/22
(52) U.S. Cl. ............................................................... 523/333
(58) Field of Search .............................. 524/495; 523/333

(56) References Cited

U.S. PATENT DOCUMENTS

| | | | | |
|---|---|---|---|---|
| 3,668,177 | * | 6/1972 | Van Herpt | 260/37 |
| 4,004,782 | * | 1/1977 | Jeppsen | 259/3 |
| 4,532,271 | * | 7/1985 | Kai | 523/208 |
| 4,599,370 | * | 7/1986 | Grossman | 523/200 |
| 4,961,887 | * | 10/1990 | Crumpler | 264/40.4 |
| 5,024,531 | * | 6/1991 | Will | 366/75 |
| 5,073,032 | * | 12/1991 | Berion | 366/168 |
| 5,232,306 | * | 8/1993 | Sterner | 404/107 |
| 5,447,388 | * | 9/1995 | Rouse | 404/72 |

* cited by examiner

*Primary Examiner*—Paul R. Michl
(74) *Attorney, Agent, or Firm*—James E. Bradley; Felsman, Bradly, Vaden, Gunter & Dillon, LLP

(57) ABSTRACT

There are disclosed method and apparatus for blending rubber or plastics in a system with particulate filler material and liquid such as oils and plasticizers, characterized in that the particulate filler material is impregnated with the liquid by a liquid spray arrangement while the filler material is being conveyed, in a manner in which the particles are generally accessible, to a mixing chamber to which other components of the rubber or plastics system have already been added or will be added before mixing.

19 Claims, 2 Drawing Sheets

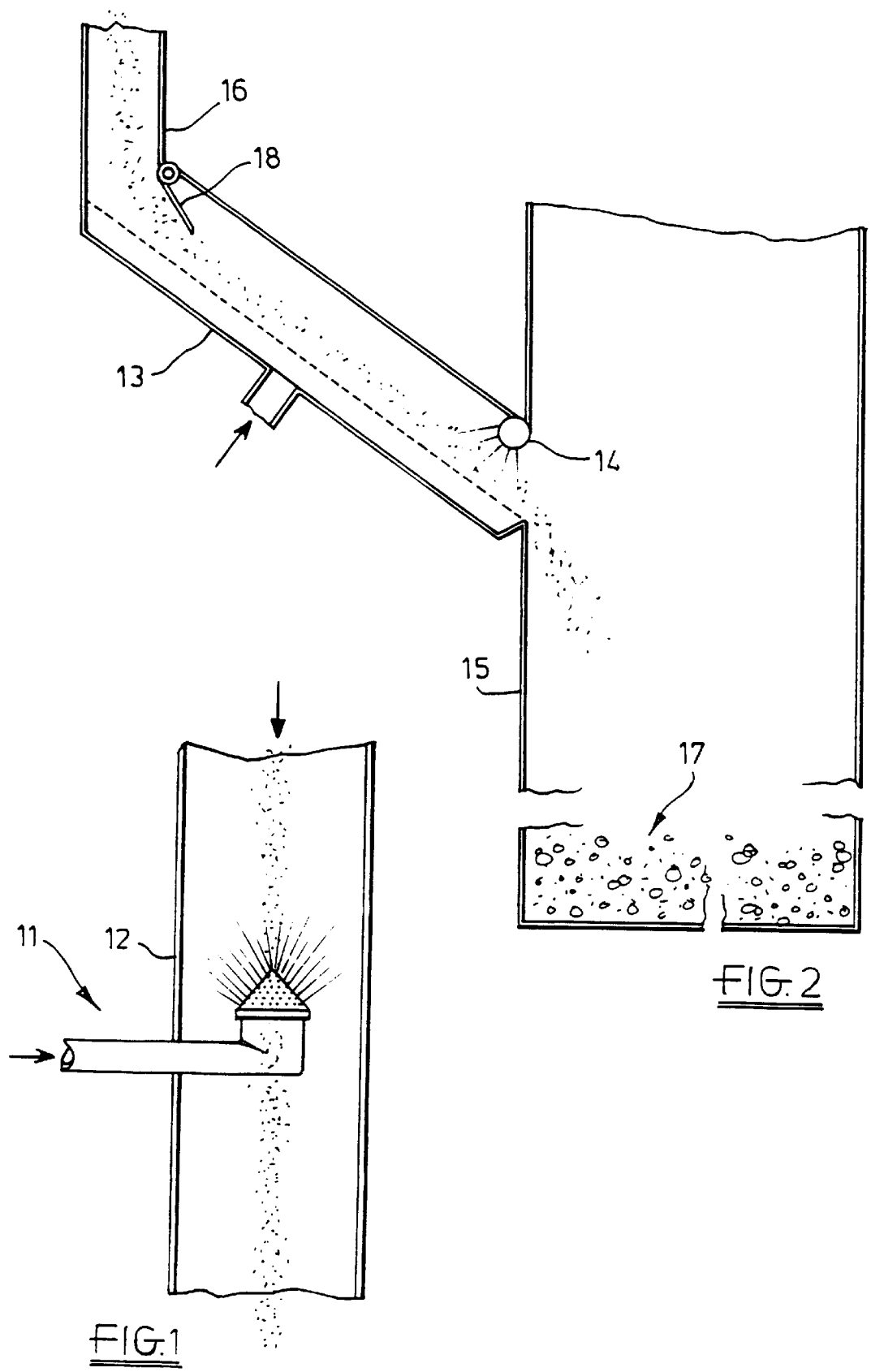

METHOD FOR BLENDING RUBBER OR PLASTICS MATERIALS

This invention relates to blending rubber or plastics materials.

Pelleted and agglomerated particulates which have internal voids as a result of being agglomerated or pelleted are often used as fillers in rubber and plastics materials. Their large internal void volume—typically two thirds of the total volume for fillers used in the rubber industry—enables them to absorb up to twice their solid volume of oils or plasticisers, after the fashion of activated carbon.

The oils or plasticisers are conventionally added to the particulates in a mixing chamber to which other components of the rubber or plastics system either have already been added or will be added before mixing.

To achieve a homogeneous product, thorough mixing is required, which takes more or less time according to the nature of the materials involved. Some particulates are prone to causing problems in transportation, particularly where attrition gives rise to a fine dust content. These problems are dealt with to some extent by choice of transport system, but some problems remain, particularly from dust as a working environment problem, also, however, as a product quality problem, where it can give rise to inhomogeneities which can critically affect the performance, for example, of automobile tires.

The present invention provides a method for blending rubber or plastics materials that can reduce or even eliminate these problems.

The invention comprises a method for blending rubber or plastics in a system with particulate filler material and liquid such as oils and plasticisers, characterised in that the particulate filler material is impregnated with the liquid by a liquid spray arrangement while the filler material is being conveyed, in a manner in which the particles are generally accessible, to a mixing chamber to which other components of the rubber or plastics system have already been added or will be added before mixing.

The material may be conveyed pneumatically, gravitationally or by using for example a vibratory, screw, belt or bucket conveyor, it merely being necessary to access the particulates so that they are at least to a significant extent able to absorb the liquid.

Clearly, a pneumatic conveyor in which the particles are carried in an airstream is particularly suited to the method but with any of the conveying methods mentioned the particulate material is accessible as a continuous stream or at least divided up into small batches.

The liquid may be metered to the particulate material and may be fed in an amount which is not substantially greater than the amount which can be absorbed by the material.

The impregnation may be effected, in a pneumatic conveying arrangement, by spraying against the flow of the particles using a wide-dispersion nozzle or an array of nozzles.

It is found, rather surprisingly, that the liquid which initially coats the particles is swiftly absorbed and actually improves the mixability of the particles as well as acting as a dust suppressant. Mixing times in the mixing chamber can be significantly reduced with greatly improved homogeneity.

The impregnation may be effected close to an outlet end of a conveyor arrangement in which the particulate material is conveyed.

In a particularly effective arrangement, the particulate material is fed gravitationally to an inclined fluidised air slide delivering to the mixing chamber. The liquid spray arrangement may be located at the lower end of the slide and may comprise a spray bar located above the inclined floor of the slide spraying downwardly. The particulate material may be admitted to the slide from a gravity feed chute and may be controlled by a regulator device, which may be adjustable.

The invention also comprises apparatus for blending rubber or plastics in a system with particulate filler material and liquid such as oils and plasticisers, characterised by a conveyor arrangement delivering the particulate material to a mixing chamber, the conveyor arrangement being arranged to convey the particulate material in a manner in which the particles are generally accessible and the conveyor arrangement having an associated liquid spraying arrangement adapted to spray the particulate material with the liquid to impregnate it while it is being conveyed, and the conveyor arrangement delivering the impregnated particulate material to a mixing chamber to be mixed with other components of the rubber or plastics system.

The invention also comprises a rubber or plastics system blended with liquid impregnated particulate filler material by a method or by apparatus as described.

Methods for treating particulate material according to the invention will now be described with reference to the accompanying drawings, in which:

FIG. 1 is a diagrammatic illustration of a first liquid spray arrangement;

FIG. 2 is a diagrammatic illustration of a second liquid spray arrangement; and

Figure 3:
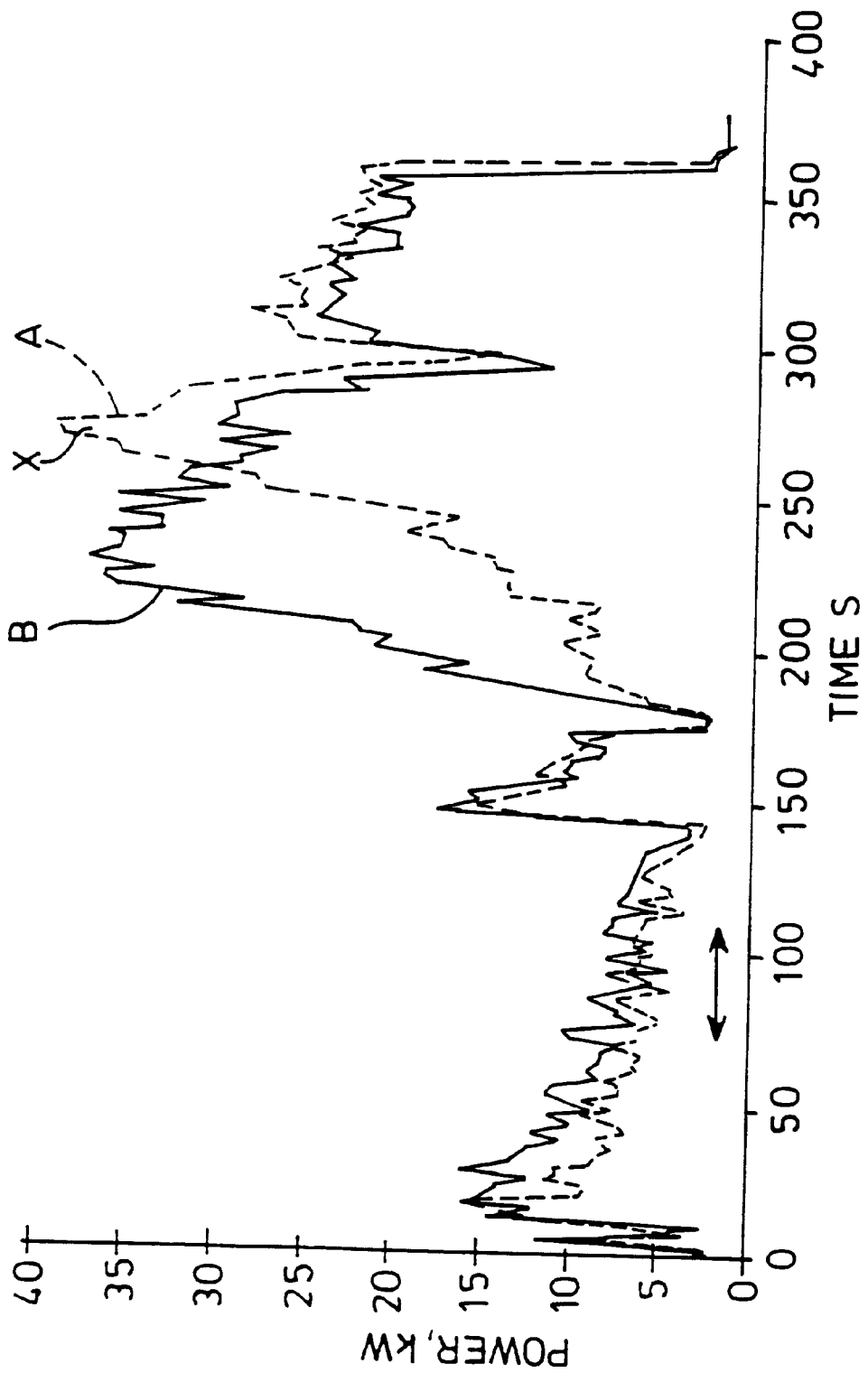
FIG. 3 is a graphical representation of the power consumption of a batch mixer comparing the addition of oil to rubber compound ingredients by the conventional method and by the method of the invention.

The drawings illustrate methods and apparatus for blending rubber or plastics materials by pre-treating particulate filler material such as carbon black which is an agglomerated particulate with a large internal void space. The pre-treatment comprises impregnating the material with a liquid by conveying the material in a manner in which the particles are generally accessible past a liquid spray arrangement 11, FIGS. 1 and 2.

The arrangement 11 in FIG. 1 comprises a wide-dispersion spray nozzle injecting a spray of liquid droplets into a flow of particulate material down a vertical pipe 12, the liquid injection being against the flow.

In FIG. 2, the particulate material is conveyed gravitationally down an air slide 13 and sprayed from a spray bar 14, before passing into a mixing chamber 15 in which other components of the rubber or plastics system, e.g. rubber crumb or plastic chip 17 have been or will be added.

Before being absorbed into the particles' void space, the liquid will, of course, coat the particles and may be expected to cause further if temporary agglomeration, which may lead to some adhesion to the walls of the air slide, and it is necessary to take this into account in deciding where the spray bar 14 is to be situated. No problems have been encountered with the spray bar 14 close to the outlet from the slide 13. The rate of absorption is such that coating liquid is substantially absorbed in good time not to be a problem in mixing in a typical rubber compounding operation.

The arrangement of FIG. 1 is appropriate for the addition of small volumes of fluid, say up to 10% of the solid volume of the particulate material while that of FIG. 2 is capable of delivering relatively large volumes of liquid right up to the maximum absorption capacity of the particulate material. In FIG. 2 is also shown a gravity feed chute 16 down which the filler material passes to the air slide 13, and an adjustable regulator device such as a swingable deflector plate 18 admitting the filler to the air slide 13 in controlled fashion.

Oil delivered in these ways is absorbed over a period in the region of five minutes to such an extent that visible wetting disappears, but even if the material is added to the mixer directly after impregnation, no free oil is observed to cause lubrication problems in subsequent mixing.

A noticeable benefit of the gradual absorption is that the visible wetting gives good dust suppression.

In FIG. 3 are plotted energy consumptions (KW) of a mixer using a rubber compound with N339 carbon black. Trace A is for a conventional process in which the oil is injected in a single stream directly into the mixer after the carbon black has been added, while trace B is for the method of the invention where the oil is added to the carbon black en route to the mixer. Carbon black addition takes place in each case over a period between 100 and 150 seconds into the operation. In trace A. the power requirement rises sharply after oil is injected into the mixing chamber at 220 s. Incorporation is complete (point X) at about 270 s.

By contrast, when the oil is added to the carbon black before its addition to the mixing chamber, incorporation is complete at about 220 s, a saving of fifty seconds.

The sharp power drop at about 300 s accompanies the addition of curatives—this could, of course, be done earlier in the process carried out according to the invention, resulting in an actual time saving, but of course there is in any event a general advantage in the improvement in homogeneity of the mix which is suggested by the traces.

Typical rubber compounds dealt with successfully by the methods of the invention include I Styrene butadiene rubber 1500–100 parts by weight, with 85 parts carbon black N339 and 35 parts oil II Natural rubber 100 parts by weight, carbon black N324, 65 parts, oil 15 parts.

Additives other than plasticisers or oils could also be incorporated by spray impregnation, such as chemical surface coating materials to promote mixing and improve material properties, minor components of a rubber or thermoplastic compound, introduced in fluid, suspension or solution form, and indeed many other substances in applications outside the rubber and plastic fields such, for example, as incorporation of biological control substances into fertiliser or pelleted animal foodstuffs.

It is also possible that a liquid can be incorporated into the particulate material in a batch operation prior to delivering to the mixing chamber, for example, in a rubber compounding operation, by spraying into or onto a fluidised or otherwise agitated bed of the material. Some particulate materials may be capable of being stored or sent as freight in their impregnated condition.

For precise metering of liquid, whether to a continuous particulate flow or to a batch method, the amount of liquid added or the rate of addition of liquid may be based on a batch weighing or continuous weighing (for example using a weigh belt) of the particulate material and accurate fluid metering pumps or the spraying of pre-weighed amounts of fluid as appropriate.

I claim:

1. A method for blending rubber or plastics in a system with particulate filler material and liquid which can be absorbed by the filler material particles, characterised in that the particulate filler material is impregnated with the liquid by a liquid spray arrangement while the filler material is being conveyed, in a manner in which the particles are generally accessible, to a mixing chamber to which other components of the rubber or plastics system have already been added or will be added before mixing, in such manner that the particulate filler material absorbs all of the liquid leaving no free liquid during blending in the mixing chamber.

2. A method according to claim 1, in which the material is pneumatically conveyed.

3. A method according to claim 1, in which the material is conveyed gravitationally.

4. A method according to claim 1, in which the material is conveyed using a vibratory conveyor.

5. A method according to claim 1, in which the material is conveyed using a screw conveyor.

6. A method according to claim 1, in which the material is conveyed using a belt conveyor.

7. A method according to claim 1, in which the material is conveyed using a bucket conveyor.

8. A method according to claim 1, in which the particulate material comprises an agglomerated or pelleted particulate material.

9. A method according to claim 1, in which the particulate material comprises an absorbent particulate material such as activated carbon.

10. A method according to claim 1, in which the particulate material comprises a proportion of dust.

11. A method according to claim 1, in which the liquid is metered to the particulate material.

12. A method according to claim 1, in which the liquid is fed to the particulate material in an amount which is not greater than the amount which can be absorbed by the material.

13. A method according to claim 1, in which the impregnation is effected close to an outlet end of a conveyor arrangement in which the particulate material is conveyed.

14. A method according to any one of claims 1 to 13, in which the particulate material is fed gravitationally to an inclined fluidised air slide delivering to the mixing chamber.

15. A method according to claim 14, in which the liquid spray arrangement is located at the lower end of the slide.

16. A method according to claim 14, in which the liquid spray arrangement comprises a spray bar located above the inclined floor of the slide spraying downwardly.

17. A method according to claim 15, in which the particulate material is admitted to the slide from a gravity feed chute by an adjustable regulator device such as a swingable deflector plate.

18. A method according to claim 1, wherein the liquid is an oil.

19. A method according to claim 1, wherein the liquid is a plasticiser.

* * * * *